(12) United States Patent
Dragomir et al.

(10) Patent No.: US 10,251,194 B2
(45) Date of Patent: Apr. 2, 2019

(54) EFFICIENT SCHEDULING IN ASYNCHRONOUS CONTENTION-BASED SYSTEM

(71) Applicants: Ioan-Virgil Dragomir, Bucharest (RO); Alexandru Balmus, Neamt (RO); Paul Marius Bivol, Bacau (RO)

(72) Inventors: Ioan-Virgil Dragomir, Bucharest (RO); Alexandru Balmus, Neamt (RO); Paul Marius Bivol, Bacau (RO)

(73) Assignee: NXP USA, Inc., Austin, TX (US)

( * ) Notice: Subject to any disclaimer, the term of this patent is extended or adjusted under 35 U.S.C. 154(b) by 413 days.

(21) Appl. No.: 14/895,943

(22) PCT Filed: Jun. 17, 2013

(86) PCT No.: PCT/IB2013/054961
§ 371 (c)(1),
(2) Date: Dec. 4, 2015

(87) PCT Pub. No.: WO2014/203029
PCT Pub. Date: Dec. 24, 2014

(65) Prior Publication Data
US 2016/0135223 A1 May 12, 2016

(51) Int. Cl.
*H04W 74/08* (2009.01)
*G06F 13/14* (2006.01)
(Continued)

(52) U.S. Cl.
CPC .......... *H04W 74/08* (2013.01); *G06F 9/4812* (2013.01); *G06F 9/4881* (2013.01); *G06F 9/546* (2013.01); *G06F 13/14* (2013.01); *G06F 2209/548* (2013.01); *H04W 72/12* (2013.01); *H04W 84/12* (2013.01)

(58) Field of Classification Search
CPC .............. G06F 15/161; G06F 17/30067; G06F 9/4881; G06F 2209/548
See application file for complete search history.

(56) References Cited

U.S. PATENT DOCUMENTS 6,567,840 B1    5/2003   Binns et al.
7,796,545 B2    9/2010   Surineni et al.
(Continued)

OTHER PUBLICATIONS

International Search Report and Written Opinion correlating to PCT/IB2013/054961 dated Mar. 13, 2014.
(Continued)

*Primary Examiner* — Romani Ohri

(57) ABSTRACT

In an operation scheduler adapted to schedule in an asynchronous contention-based system a first FIFO queue is adapted to store one trigger message or one operation request. A message router is coupled to the first FIFO queue and is adapted to route instructions to a second FIFO queue or a memory and locate in the memory the instructions of a suspended operation associated with a trigger message and authorize execution of the suspended operation. An arbitration unit is coupled to the second FIFO queue and to the memory, and is adapted to schedule the execution of instructions associated with a standalone non-preemptable operation during a period of time within which at least one operation of the first sequence is being suspended.

9 Claims, 3 Drawing Sheets

(51) Int. Cl.
  *G06F 9/48* (2006.01)
  *G06F 9/54* (2006.01)
  *H04W 72/12* (2009.01)
  *H04W 84/12* (2009.01)

(56) References Cited

U.S. PATENT DOCUMENTS

| | | | |
|---|---|---|---|
| 2003/0061459 A1 | 3/2003 | Aboulenein et al. | |
| 2004/0068623 A1* | 4/2004 | Augsburg | G06F 12/0831 711/146 |
| 2006/0206635 A1* | 9/2006 | Alexander | G06F 13/28 710/22 |
| 2007/0028030 A1* | 2/2007 | Mahrla | G06F 13/28 711/100 |
| 2007/0110087 A1* | 5/2007 | Abel | H04L 45/00 370/412 |
| 2008/0031282 A1 | 2/2008 | Vestal | |
| 2009/0265486 A1* | 10/2009 | Jenkins | G06F 9/5011 710/60 |
| 2010/0268743 A1* | 10/2010 | Hallyal | G06F 17/30961 707/797 |
| 2011/0099204 A1* | 4/2011 | Thaler | G06F 9/5038 707/797 |
| 2011/0296124 A1* | 12/2011 | Fredenberg | G06F 12/0284 711/157 |
| 2012/0076152 A1 | 3/2012 | Mansharamani | |
| 2012/0082036 A1 | 4/2012 | Abedi et al. | |
| 2012/0303936 A1 | 11/2012 | Tran et al. | |
| 2013/0097349 A1* | 4/2013 | Lu | G06F 13/161 710/122 |

OTHER PUBLICATIONS

Wikipedia, "Time-division multiple access," downloaded from <<https://en.wikipedia.org/wiki/Time-division_multiple_access>> on May 7, 2018; 4 pages.

Wikipedia, "GSM," downloaded from <<https://en.wikipedia.org/wiki/GSM>> on May 7, 2018, 9 pages.

Wikipedia, "Out-of-order execution," downloaded from <<https://en.wikipedia.org/wiki/Out-of-order_execution>> on May 7, 2018; 5 pages.

* cited by examiner

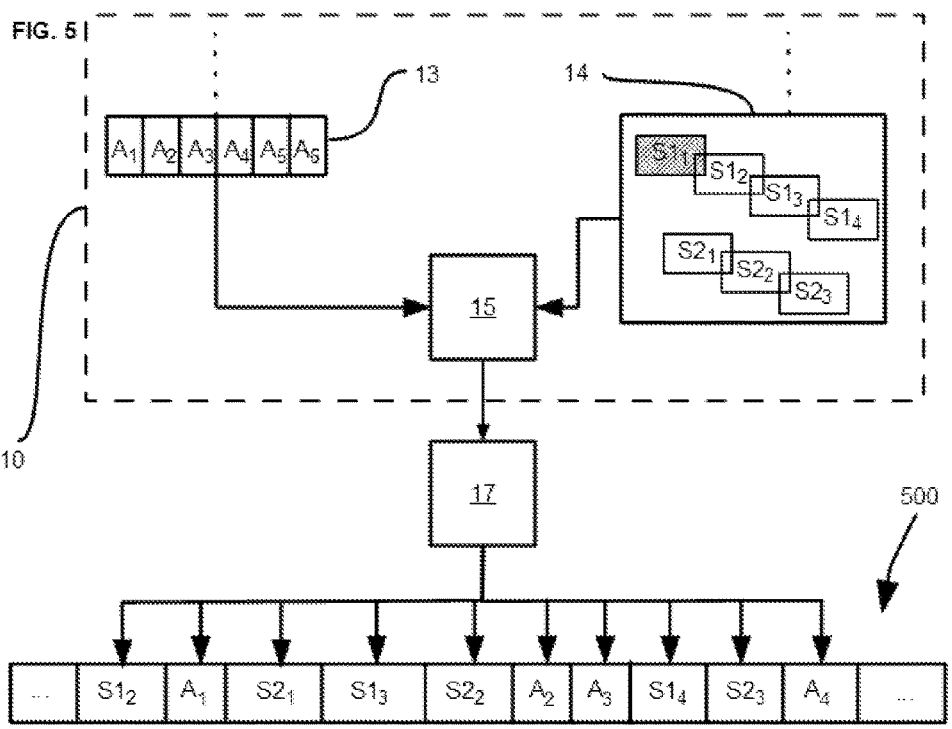

EFFICIENT SCHEDULING IN ASYNCHRONOUS CONTENTION-BASED SYSTEM

FIELD OF THE INVENTION

This invention relates to an operation scheduler, a communication apparatus, a communication system and a method of scheduling.

BACKGROUND OF THE INVENTION

Contention-based mechanisms are employed in protocols of a variety of different types of communication systems such as in local area networks (e.g., Ethernet system), wireless networks (e.g., IEEE 802.11 systems), home area network (HAN) systems, and Advanced Metering Infrastructure (AMI) networks, among others. In a contention-based system, there is a competition to access a scarce resource (e.g., a memory).

Such competition in a contention-based system typically occurs within a contention window. For example, in asynchronous systems, such as in non-beacon mode of IEEE 802.15.4 systems, the contention window is un-slotted and requests for access to the scarce resource may be sent at any given time such that the occurrence of incoming requests for access to the scarce resource is highly unpredictable.

In that case, when the scarce resource is a scarce execution resource such as a processor, a successful request may invoke the execution of at least one operation such as a task, a process, a job, a function or a method.

Furthermore, where the operations are based on a message-driven model, execution can be invoked for either a standalone operation or a sequence of operations wherein a sequence of operations comprises at least two standalone operations that are linked together such that the execution of the next operation is triggered upon reception of a given message.

Also, in such model, execution can be based on one request at a time. Therefore, during the execution of a sequence of operations, incoming requests for the execution of standalone operations are rejected and/or delayed for a certain time period.

Unfortunately, conventional scheduler such as those used in synchronous systems (e.g., TDMA-based systems) cannot be used to optimise the execution of both standalone operations and sequence of operations. In fact, in synchronous systems, the occurrence of incoming requests for access to the scarce resource is highly predictable since the contention window is slotted (i.e., divided in a number of slots) such that a specific request may only be sent during a predetermined slot.

SUMMARY OF THE INVENTION

The present invention provides an operation scheduler, a communication apparatus, a communication system and a method of scheduling as described in the accompanying claims. Specific embodiments of the invention are set forth in the dependent claims. These and other aspects of the invention will be apparent from an elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

FIG. 5 is a schematic block diagram of an exemplary embodiment of the subject application.

DETAILED DESCRIPTION OF THE PREFERRED EMBODIMENTS

Because the illustrated embodiments of the proposed solution may for the most part, be composed of electronic components and circuits known to those skilled in the art, details will not be explained in any greater extent than that considered necessary for the understanding and appreciation of the underlying concepts of the subject application, in order not to obfuscate or distract from the teachings of the subject application.

However, for the sake of clarity and for a proper understanding of the subject application, some definitions of the terms used thereinafter will be given first. In the following:

- a "standalone non-preemptable operation" shall be understood as meaning a logical block of execution that cannot be preempted by another operation of the same kind. For example, a standalone non-preemptable operation may be a task, process, a job, a function or a method. However, software interrupts with priority inversion such as those induced by mutexes, semaphores, events, or any other similar mechanism are permitted.
- a "sequence of non-preemptable operations" shall be understood as meaning a sequence of at least two standalone non-preemptable operations wherein after completion of one operation of the sequence, the execution of a subsequent operation is suspended until at least one trigger message associated with the subsequent operation is detected. For example, the following "Step1→Trigger→Step2" is a sequence of operations in accordance with the above definition. Thereinafter, such sequence may be represented as follows: $\{S_1, S_2\}$ wherein the trigger message is omitted for the purpose of brevity.
- a "request" shall be understood as meaning a message containing all the parameters needed to trigger the execution of an operation (i.e., standalone non-preemptable operation or sequence of operations).

Figure 1:
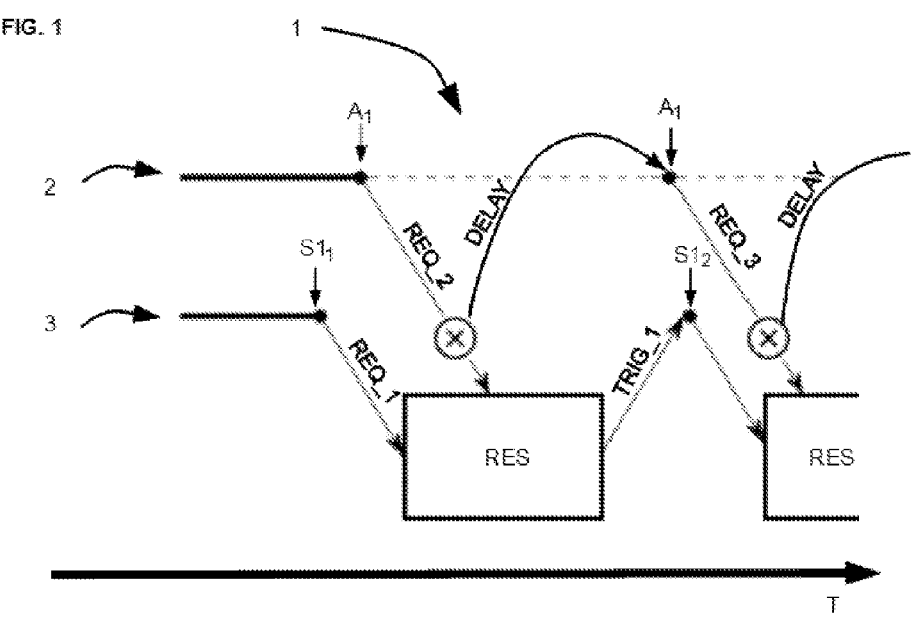
FIG. 1 is a schematic diagram of an asynchronous contention-based system.

Referring to FIG. 1, there is diagrammatically shown therein an asynchronous contention-based system 1 using a message-driven model and which is represented over time T. The system 1 as shown comprises:

- one scarce execution resource RES such as a processor,
- a list of standalone non-preemptable operations to be executed 2 comprising one standalone non-preemptable operation $A_1$ and,
- a list of sequences to be executed 3 comprising one sequence S1 having two operations $S1_1$ and $S1_2$.

In the example of FIG. 1, operation $S1_1$ is executed first based on the request REQ_1. During the execution of operation $S1_1$ by the scarce execution resource RES, there is an attempt to execute the standalone non-preemptable operation $A_1$ based on the request REQ_2. As can be seen, the request REQ_2 is discarded and delayed for a certain period of time DELAY. This is mainly due to the fact the execution of $S1_1$ can not be preempted by the execution of $A_1$ since there are of the same kind (i.e. there are both non-preemptable operations). After completion of $S1_1$, there is another attempt to execute the standalone non-preemptable operation $A_1$ based on the request REQ_2. As can be seen, the renewed request REQ_2 is discarded again. However, this time, the rejection is due to the fact that after completion of $S1_1$, a trigger message TRIG_1 is detected and the subsequent operation $S1_2$ is executed first. In fact, in the asynchronous contention-based system 1, while a sequence is being executed by the scarce execution resource RES, a standalone non-preemptable operation such as $A_1$ can not be executed until completion of the last operation of the sequence. Namely, where the sequence S1 is executed first, $A_1$ can only be executed after completion of all operations of S1.

By the operation scheduler proposed herein, an effective scheduling mechanism may be achieved for at least such systems by interleaving the execution of standalone non-preemptable operations and sequence operations, thus leading to a reduction rejection ratio in such systems.

Figure 2:
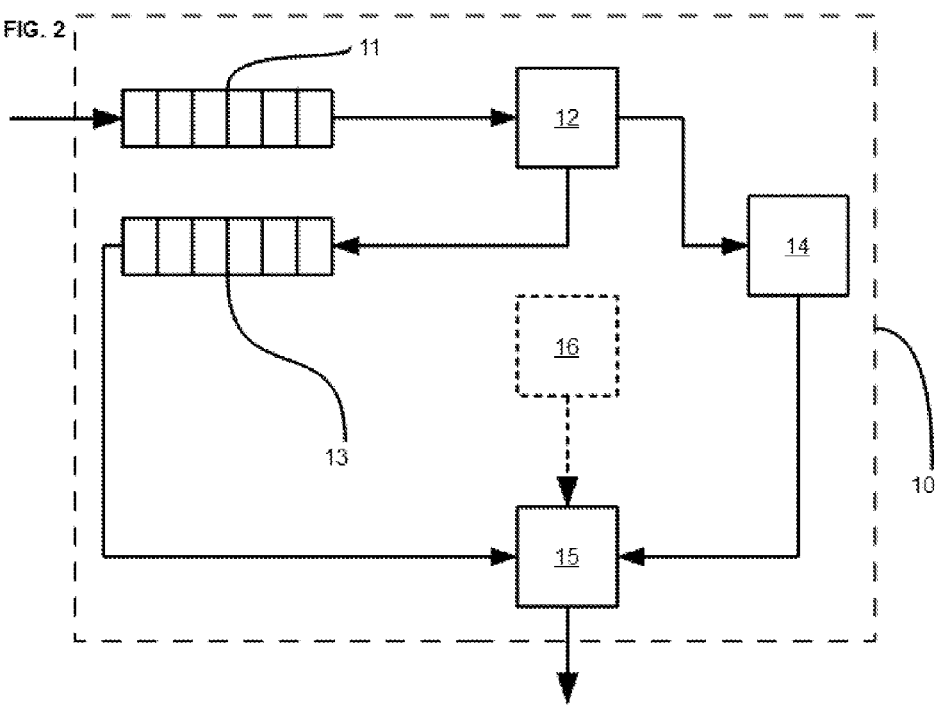
FIG. 2 is a schematic block diagram of an embodiment of the subject application.

Referring to FIG. 2, there is diagrammatically shown therein an exemplary operation scheduler 10. The operation scheduler 10 is adapted to schedule in an asynchronous contention-based system 1, the execution of at least one standalone non-preemptable operation and of at least a first sequence of operations wherein after completion of one operation of the sequence, the execution of a subsequent operation is suspended until at least one trigger message associated with the subsequent operation is detected by the system. The operation scheduler 10 as shown comprises:

- a first and second buffers such as first-in-first-out, FIFO, queues 11, 13 or any other similar structures, adapted to store asynchronous inputs in a first-in-first-out fashion;
- a memory unit 14 adapted to store at least one instruction associated with at least one operation of the sequence of operations;
- a messaging gateway unit such as a message router 12; and,
- an control unit such as an arbitration unit 15.

In examples of embodiments, at least both the message router 12 and the arbitration unit 15 may be implemented as hardware, software or any combination thereof, for instance.

In the example of FIG. 2, the first FIFO queue 11 is adapted to store at least one trigger message and/or one operation request wherein an operation request comprises at least one instruction associated with the execution of:
- one standalone non-preemptable operation, or
- one sequence of operations.

It is therefore proposed to queue the requests in their order of arrival in the first FIFO queue 11. Therefore, it is to be understood that requests are data that inputted to the first FIFO queue 11 whatever the kind of the request may be. It is to be also noted that the above feature enables to reduce the overall rejection ratio of the requests since the requests are buffered. However, it will be appreciated that more than one FIFO queue may be used in association to provide the same effect as the first FIFO queue 11.

Referring back to FIG. 2, the message router 12 is operably coupled the first FIFO queue and is adapted to route instructions associated with a standalone non-preemptable operation to the second FIFO queue 13. The message router 12 is further adapted to route instructions associated with a sequence to the memory unit 14. Based on the above features, it is to be understood that the message router 12 is adapted to act as a dispatcher for the requests stored in the first FIFO queue 11. The message router 12 is also adapted to locate in the memory unit the instructions of a suspended operation associated with a trigger message and authorise execution of the suspended operation. Therefore, it is to be noted that the message router 12 is capable of keeping track of the execution status (i.e., suspended or non-suspended) of the operations of each of the sequences stored in the memory unit 14.

Referring back to FIG. 2, the arbitration unit 15 is operably coupled to the second FIFO queue 13 and to the memory unit 14. In the example of FIG. 2, the arbitration unit 15 is adapted to schedule the execution of instructions associated with a standalone non-preemptable operation during a period of time within which at least one operation of the first sequence is being suspended. In an example, referring to FIG. 1, the execution of the standalone non-preemptable operation $A_1$ may be inserted between the execution of operations $S1_1$ and $S1_2$. Therefore, in this example, competition between standalone non-preemptable operations and at least one sequence of operations may be handled without any rejection.

Possibly, in one embodiment, the arbitration unit 15 may be further adapted to schedule the execution of instructions associated with a non-suspended operation of a second sequence during the period of time within which at least one operation of the first sequence is being suspended. It is to be noted that this feature may be directed to handle competition that may arise between at least two sequences such as {$S1_1$, $S1_2$, $S1_3$} and {$S2_1$, $S2_2$}. In the foregoing example, if it is considered that operation $S1_1$ has been executed and that operation $S1_2$ is suspended until the detection of a trigger message, then operation(s) $S2_1$ and/or $S2_2$ may be scheduled to be executed during the period of time during which the trigger message is being expected.

Additionally, in another embodiment, the arbitration unit 15 may be further adapted to schedule the execution of instructions associated with a standalone non-preemptable operation and/or with at least a non-suspended operation of the second sequence based on a priority associated with the instructions. The priority may be based on, for example, the content of the instructions to be executed. For example, where instructions are associated with the execution of services or tasks, the priority may be based on a quality of service (QoS) level assigned to each service of task. However, it will be appreciated that other priority determination or scheme may be used as well.

Figure 3:
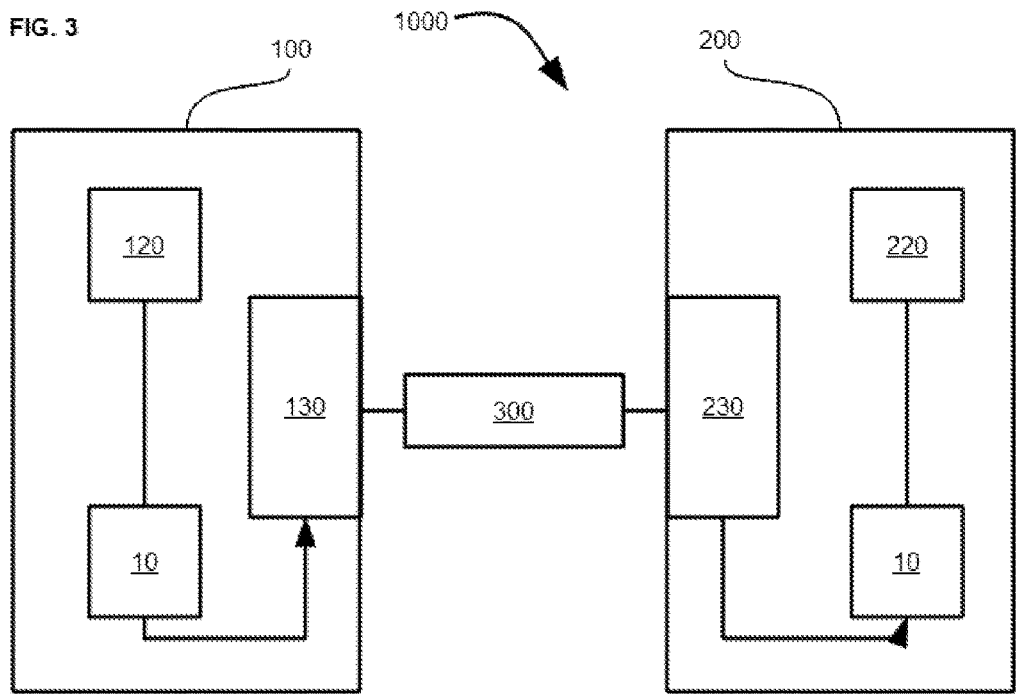
FIG. 3 is a schematic block diagram of a system in accordance with the subject application.

In one of the embodiments, the operation scheduler 10 may further comprise a resource controller 16 which may be coupled to the arbitration unit 15. In examples of embodiments, the resource controller 16 may be implemented as hardware, software or any combination thereof, for instance. The resource controller 16 may be adapted to determine an amount of available execution resources available in the system. This way, the arbitration unit 15 may be further adapted to schedule the execution of instructions associated with a standalone non-preemptable operation and/or with a non-suspended operation of the second sequence based on the amount of available execution resources. In an example, referring to FIG. 1, the execution of the standalone non-preemptable operation $A_1$ may be inserted between the execution of operations $S1_1$ and $S1_2$ only if enough execution resources are available. Furthermore, let's consider the example of a competition between two sequences such as {$S1_1$, $S1_2$, $S1_3$} and {$S2_1$, $S2_2$} wherein operation $S1_1$ has been executed and $S1_2$ is suspended to the detection of a trigger message. In this example, operation $S2_1$ may be scheduled to be executed during the period of time within which the trigger message is expected while the execution of $S2_2$ may not be, due to a lack of execution resources. Referring now to FIG. 3, there is diagrammatically shown therein an exemplary communication system 1000. The communication system 1000 as shown comprises at least:
one first communication apparatus 100;
one second communication apparatus 200; and,
a communication network 300 wherein, the first and second apparatuses 100, 200 are adapted to communicate together through the communication network.

In the example of FIG. 3, the first and second apparatuses as shown comprises:
a processor 120, 220 adapted to process data to be transmitted and/or received;
a communication unit 130, 230 adapted to transmit or receive the data;
the operation scheduler 10 of FIG. 2 adapted to schedule the transmission or the reception of the data.

In FIG. 3, the first apparatus 100 is operably coupled to the communication unit 130 and to the processor 120, the communication unit 130 being adapted to transmit the data. Also, on this example, the second apparatus 200 is operably coupled to the communication unit 230 and the processor 220, the communication unit 230 being adapted to receive the data.

For example, in one embodiment, the communication system 1000 may be used to manage request-indication or response-confirm communication models through the communication network 300. In an example, inter-processor communication with a plurality of clients may be implemented. For such case, the communication network 300 may comprise, for example, a serial interface (e.g., UART, SPI, I2C). This way, using the operation scheduler 10 of FIG. 2 on the first and second apparatuses 100, 200 it may be possible to provide a request-indication or response-confirm based mechanism for communication between operations (e.g., tasks, jobs, processes) that are executed on the processors 120, 130 in the first and second apparatuses 100, 200. However, it will be appreciated that more than one apparatuses may be used in such system. It is also to be noted that other applications and/or other physical interfaces such as radio or optical transceivers may be used in such communication system 1000.

Figure 4:
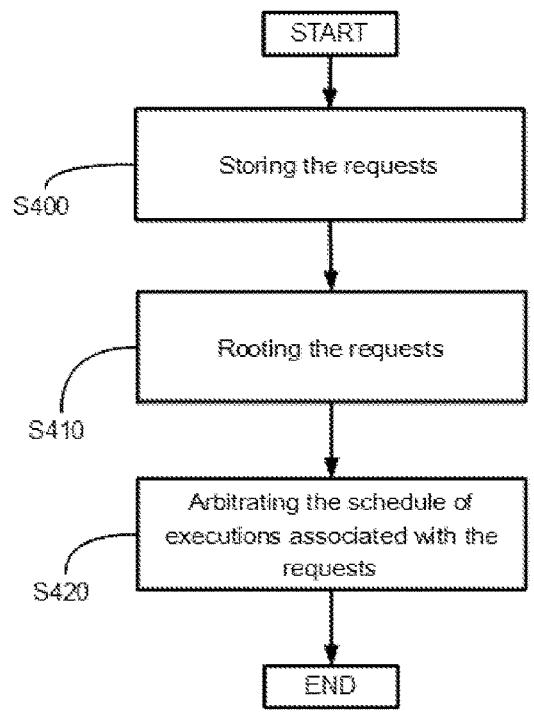
FIG. 4 is a schematic flow diagram of a method according to an embodiment of the subject application.

Referring now to FIG. 4, there is diagrammatically shown therein a flow diagram of a method according to an embodiment of the subject application.

In FIG. 4, in S400, it is stored in the first FIFO queue 11, in a first-in-first-out fashion, at least one trigger message and/or one operation request wherein an operation request comprises at least one instruction associated with the execution of:
one standalone non-preemptable operation, or
one sequence of operations.

In S410, based on the first FIFO queue 11, it is:
routed instructions associated with a standalone non-preemptable operation to the second FIFO queue 13 wherein instructions are arranged in a first-in-first-out fashion,
routed instructions associated with the first sequence to the memory unit 14;
located in the memory unit 14 the instructions of a suspended operation associated with a trigger message and it is authorised the execution of the suspended operation.

In S420, based on the second FIFO queue 13 and the memory unit 14, it is arbitrated the schedule of the execution of instructions associated with a standalone non-preemptable operation during a period of time within which at least one operation of the first sequence is being suspended Possibly, in one embodiment, it may further be arbitrated the schedule of the execution of instructions associated with a non-suspended operation of the second sequence during a period of time within which at least one operation of the first sequence is being suspended.

Additionally, in another embodiment, it may further be arbitrated the schedule of the execution of instruction associated with a standalone non-preemptable operation and/or with at least a non-suspended operation of the second sequence based on a priority associated with the instructions.

In one of the embodiments it may further be:
determined an amount of available execution resources available in the system; and,
arbitrated the schedule of the execution of instruction associated with a standalone non-preemptable operation and/or with at least a non-suspended operation of the second sequence based on the amount of available execution resources.

Referring now to FIG. 5, there is diagrammatically shown therein a schematic block diagram of an exemplary embodiment of the subject application. In the example of FIG. 5, there is shown the operation scheduler 10 of FIG. 2 wherein the first FIFO queue 11 and the message router 12 have been omitted for the sake of clarity. In FIG. 5, there also shown a processing unit such as a processor 17. The processor 17 is adapted to execute operations such as those presented above. Referring to FIG. 5, there is shown therein an execution timeline 500 of operations based on the teachings of the subject application.

In FIG. 5, there is shown:
the second FIFO queue 13 which comprises six non-preemptable operations $A_1$, $A_2$, $A_3$, $A_4$, $A_5$ and $A_6$, wherein $A_1$ is the first non-preemptable operation in the second FIFO queue 13; and,
the memory unit 14 which comprised two sequences of operations $S_1$ and $S_2$ wherein $S_1$ comprises four operations ($S1_1$, $S1_2$, $S1_3$, $S1_4$) and $S2$ comprises three operations ($S2_1$, $S2_2$, $S2_3$). It is to be noted that operation $S1_1$ is greyed out to indicate that it has been already executed by the processor.

Based on the teachings of the subject application such as the method of FIG. 4, the execution timeline 500 as exemplary shown may be contemplated. In this example, the execution timeline 500 starts the execution of operation $S1_2$. Then A1 followed by operation $S2_1$ are executed. There might have been a competition between $A_1$ and operation $S2_1$ wherein $A_1$ may have won the competition because it had a higher priority and/or because there were not enough execution resources in the processor 17 to handle the execution of operation $S2_1$. It is to be noted that operations of $A_1$ and of operation $S2_1$ have been executed due to the completion of operation $S1_2$ and because a trigger message associated with the execution of operation $S1_3$ has not yet been detected. The subsequent part of the execution timeline 500 is based on the same reasoning and the same approach.

The skilled person would appreciate that the proposed solution may be embodied in an electronic system that improves scheduling of non-preemptable operations and sequences of non-preemptable operations, in an asynchronous contention-based system, for example. The electronic system may be integrated in a single apparatus for managing the execution of operations therein such as processes, tasks, jobs or service. The electronic system may also be integrated in a plurality of apparatuses capable of communicating together such that request-indication or response-confirm communication models may be implemented. Additionally, one should appreciate that the subject application takes advantage of the inherent propriety of the message-driven model wherein subsequent operations are executed after a given period of time. The proposed solution may thus provides less overall execution time, longer sleep periods and lower battery consumption for apparatus embodying the teachings of the subject application.

Of course, the above advantages are exemplary, and these or other advantages may be achieved by the proposed solution. Further, the skilled person will appreciate that not all advantages stated above are necessarily achieved by embodiments described herein.

The proposed solution may also be implemented in a computer program product stored in a non-transitory computer-readable storage medium that stores computer-executable code which causes a processor computer to perform the operation of the operation scheduler, for instance. For example, the feature directed to the resource controller may be embodied in a program product.

A computer program product is a list of instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory unit storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as an operation to users and programs of the system.

The computer system may for example include at least one processing unit, associated memory unit and a number of input/output (I/O) devices. When executing the computer program, the computer system processes information according to the computer program and produces resultant output information via I/O devices.

In the foregoing specification, the proposed solution has been described with reference to specific examples of embodiments of the proposed solution. It will, however, be evident that various modifications and changes may be made therein without departing from the broader scope of the proposed solution as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. For example, the user alert device and the driver alert may be combined in a single module. Also, one or more sensors may be combined in a single module.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the proposed solution is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or operations then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An operation scheduler adapted to schedule, in an asynchronous contention-based system, the execution of standalone non-preemptable operations and of sequences of non-preemptable operations wherein after completion of a first operation of a sequence of the sequences of non-preemptable operations, the execution of a second operation of the sequence of the sequences of non-preemptable operations is suspended until a trigger message associated with the second operation is detected by the asynchronous contention-based system, the operation scheduler comprising:
first and second first-in-first-out (FIFO) queues adapted to store asynchronous inputs in a first-in-first-out fashion, wherein the first FIFO queue is adapted to store trigger messages and operation requests, said operation requests comprising instructions associated with the execution of the standalone non-preemptable operations and instructions associated with the sequences of non-preemptable operations, and wherein the second FIFO queue is adapted to store instructions associated with the standalone non-preemptable operations;
a memory adapted to store instructions associated with the sequences of non-preemptable operations;
a message router coupled to the first and second FIFO queues and to the memory; and
an arbitration circuit coupled to the second FIFO queue and to the memory
wherein the message router is adapted to:
route a first instruction associated with a particular standalone non-preemptable operation to the second FIFO queue; and
store a second instruction associated with a first sequence of non-preemptable operations to the memory, wherein the first sequence of non-preemptable operations is suspended while a first trigger message associated with the second instruction has not been received by the first FIFO queue; and
wherein the arbitration circuit is further adapted to:
determine whether the first instruction was routed to the second FIFO queue before the first trigger message was received by the first FIFO queue;
schedule the execution of the first instruction when the first instruction was routed to the second FIFO queue before the first trigger message was received by the first FIFO queue; and
schedule the execution of the second instruction when the first instruction was not routed to the second FIFO queue before the first trigger message was received by the first FIFO queue.

2. The operation scheduler of claim 1, wherein:
the message router is further adapted to route a third instruction associated with a second sequence of non-preemptable operations to the memory, wherein the second sequence of non-preemptable operations is a suspended operation while a second trigger message associated with the third instruction has not been received by the first FIFO queue; and
the arbitration circuit is further adapted to:
determine whether the second trigger message was received by the first FIFO queue before the first trigger message was been received by the first FIFO queue;
schedule the execution of the third instruction when the second trigger message was received by the first FIFO queue before the first trigger message was received by the first FIFO queue; and;
schedule the execution of the second instruction when the second trigger message was not received by the first FIFO queue before the first trigger message was received by the first FIFO queue.

3. The operation scheduler of claim 1, wherein the arbitration circuit is further adapted to schedule the execution of instructions associated with at least one of a standalone non-preemptable operation or a non-suspended operation of the second sequence based on a priority associated with the instructions.

4. The operation scheduler of claim 1, further comprising:
a resource controller coupled to the arbitration circuit and adapted to determine an amount of available execution resources available in the system;
wherein the arbitration circuit is further adapted to schedule the execution of instructions associated with at least one of a standalone non-preemptable operation or a non-suspended operation of the second sequence based on the amount of available execution resources.

5. A method of scheduling, in an asynchronous contention-based system, the execution of standalone non-preemptable operations and of sequences of non-preemptable operations wherein after completion of a first operation of a sequence of the sequences of non-preemptable operations, the execution of a second operation of the sequence of the sequences of non-preemptable operations is suspended until a trigger message associated with the second operation is detected by the asynchronous contention-based system, the method comprising:
storing in a first first-in-first-out (FIFO) queue, in a first-in-first-out fashion, trigger messages and operation requests, said operation requests comprising instructions associated with the execution of the standalone non-preemptable operations and instructions associate with the sequences of non-preemptable operations;
routing instructions associated with standalone non-preemptable operations to a second FIFO queue, in a first-in-first-out fashion, wherein the second FIFO queue is adapted to store instructions associated with the standalone non-preemptable operations and to not store instructions associated with the sequences of non-preemptable operations;
storing instructions associated with sequences of non-preemptable operations to a memory, wherein the memory is adapted to store instructions associated with sequences on non-preemptable operations and to not store instructions associated with standalone non-preemptable operations;
locating in the memory the instructions of a suspended operation associated with a trigger message and authorizing execution of the suspended operation;
based on the second FIFO queue and the memory, arbitrating the schedule of the execution of instructions associated with the at least one standalone non-preemptable operation during a period of time within which at least one operation of the first sequence is being suspended.

6. The method of claim 5, further arbitrating the schedule of the execution of instructions associated with a non-suspended operation of a second sequence during a period of time within which at least one operation of the first sequence is being suspended.

7. The method of claim 5, further comprising:
arbitrating the schedule of the execution of instructions associated with at least one of a standalone non-preemptable operation or a non-suspended operation of the second sequence based on a priority associated with the instructions.

8. The method of claim 5, further comprising:
determining an amount of available execution resources available in the system; and
further arbitrating the schedule of the execution of instructions associated with at least one of a standalone non-preemptable operation or a non-suspended operation of the second sequence based on the amount of available execution resources.

9. An operation scheduler of an asynchronous contention-based system, the operation scheduler comprising:
a first first-in-first-out (FIFO) queue configured to store instructions of non-preemptable stand alone operations, to store instructions of non-preemptable sequence operations, and to store trigger messages associated with particular instruction of the sequence operations;
a message router coupled to the first FIFO queue;
a second FIFO queue coupled to the message router and configured to store instructions of the stand alone non-preemptible operations and to not store instructions of the sequences of non-preemptable operations;
a memory coupled to the message router and configured to store instructions of the sequences of non-preemptible operations and to not store instructions of the standalone non-preemptable operations; and
an arbitration circuit coupled to the second FIFO queue and to the memory;
wherein the message router is configured to:
route a first instruction of a particular standalone non-preemptable operation to the second FIFO queue; and
store a second instruction of a first sequence of non-preemptable operations in the memory, wherein the first sequence of non-preemptable operations is suspended while a first trigger message associated with the second instruction has not been received by the first FIFO queue; and
wherein the arbitration circuit is configured to:
determine whether the first instruction was routed to the second FIFO queue before the first trigger message was received by the first FIFO queue;
schedule the execution of the first instruction when the first instruction was routed to the second FIFO queue before the first trigger message was received by the first FIFO queue; and
schedule the execution of the second instruction when the first instruction was not routed to the second FIFO queue before the first trigger message was received by the first FIFO queue.

* * * * *